United States Patent [19]
Kawai

[11] Patent Number: 5,644,600
[45] Date of Patent: Jul. 1, 1997

[54] MULTI-VALUED SIGNAL DECODING CIRCUIT HAVING BIT SYNCHRONIZATION SIGNAL TIMING TRANSITION WHICH IS SAMPLED AND HELD

[75] Inventor: Kazuo Kawai, Yokohama, Japan

[73] Assignee: General Research of Electronics, Inc., Tokyo, Japan

[21] Appl. No.: 336,394

[22] Filed: Nov. 8, 1994

[30] Foreign Application Priority Data

Nov. 8, 1993 [JP] Japan ................................. 5-302320

[51] Int. Cl.⁶ .................................................. H04L 25/34
[52] U.S. Cl. ................................... 375/286; 375/360
[58] Field of Search ............................... 375/286, 287, 375/360, 365, 368, 293; 370/94.1, 94.2, 100.1, 105.1, 105.4, 105.5, 503

[56] References Cited

U.S. PATENT DOCUMENTS

| | | | |
|---|---|---|---|
| 4,696,016 | 9/1987 | Rozema et al. | 375/293 |
| 4,852,124 | 7/1989 | Raucci | 375/293 |
| 5,140,620 | 8/1992 | Woodward | 375/375 |
| 5,267,267 | 11/1993 | Kazawa et al. | 375/294 |
| 5,539,784 | 7/1996 | Brauns et al. | 375/360 |

*Primary Examiner*—Wellington Chin
*Assistant Examiner*—William Lietho
*Attorney, Agent, or Firm*—Trexler, Bushnell, Giangiorgi & Blackstone, Ltd.

[57] ABSTRACT

A multi-valued signal decoding circuit is disclosed which has a circuit for detecting a bit synchronization signal included in the multi-valued data signal transmitted in the form of a packet signal, a circuit for detecting by this detected output a timing of a transition of the bit synchronization signal, a circuit for sampling and holding the bit synchronization signal by using sampling pulses generated on the bases of said timing, and a circuit for decoding the multi-valued data signal by using decoding reference voltages formed on the basis of the sampled and held level.

5 Claims, 8 Drawing Sheets

FIG. 1
| A | B | C | D | E | F |
A: BIT SYNCHRONIZATION CODE
B: FRAME SYNCHRONIZATION CODE
C: CALLING AND DESTINATION CODES
D: TERMINAL CONTROL CODE
E: DATA TRANSMISSION CODE
F: ADDITIONAL ERROR DETECTION CODE
FIG. 2
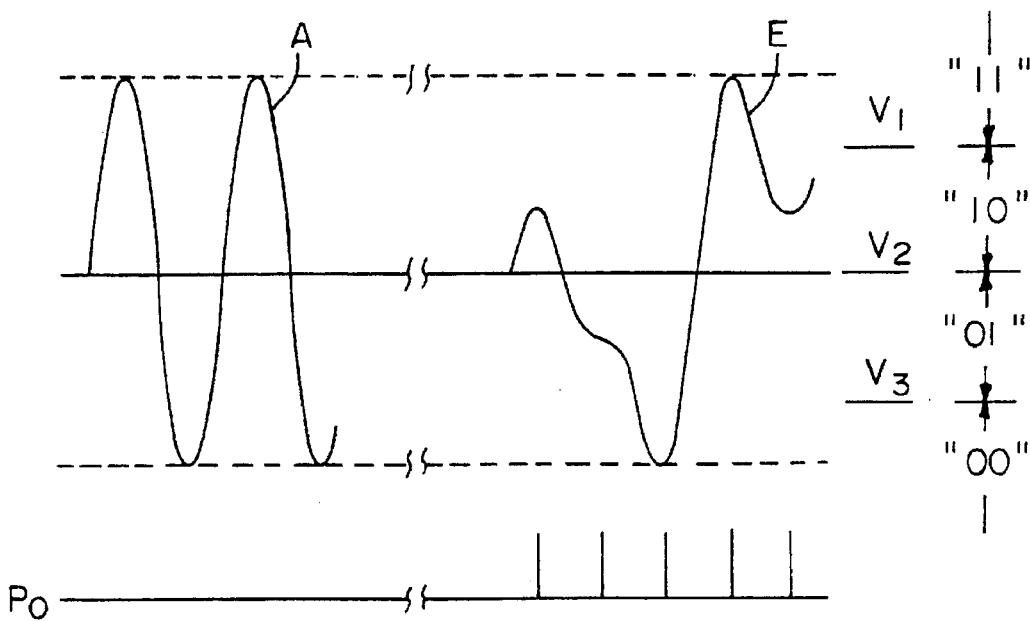

FIG. 9
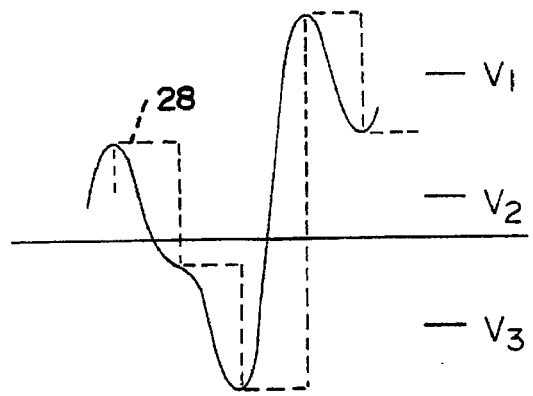
29
30
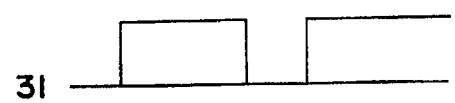
31
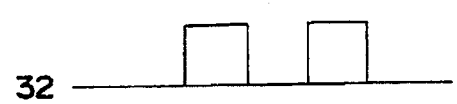
32
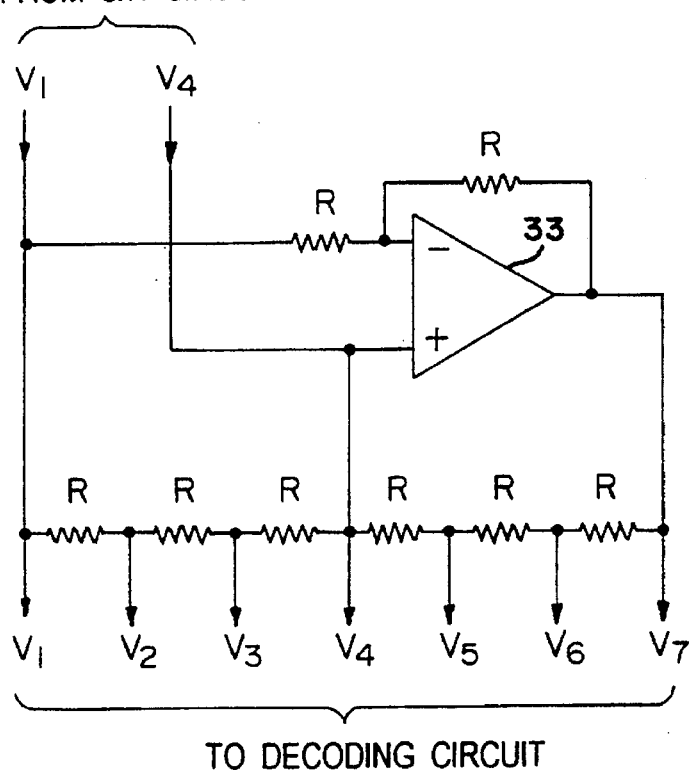
FIG. 10

MULTI-VALUED SIGNAL DECODING CIRCUIT HAVING BIT SYNCHRONIZATION SIGNAL TIMING TRANSITION WHICH IS SAMPLED AND HELD

FIELD OF THE INVENTION

This invention relates to a decoder circuit for decoding a multi-valued data transmission signal which has been assembled into a packet.

BACKGROUND OF THE INVENTION

In a wire or wireless transmission system through which a multi-valued signal is transmitted, because its transmission path and transmitting/receiving circuits are sensitive to any variation of ambient temperature, power supply voltage or the like, the amplitude and DC center level of the multi-valued signal which is inputted into an encoding circuit as an input baseband signal is changed. Since such changes are directly connected to the decease of noise margin, large changes cause an error in decision in the decoding circuit.

Therefore, it is desired to make such circuit design and mechanical design that an influence due to extrinsic factors such as ambient temperature, power supply voltage, etc. can be avoided. However, to attain such desire brings about the increase of production costs inevitably.

Another attempt was to apply an automatic amplitude controlling circuit for coping with the amplitude change and an automatic DC center level correcting circuit for coping with the DC center level change. In general, this arrangement includes a negative feedback control loop which operates with a specified signal, for example, a bit synchronization signal, etc. included in the header portion of the packet. Therefore, in order to stabilize the operation of this loop, a loop operation convergence period of time is needed. Moreover, this operation must be completed before the multi-valued signal which is data information starts. Accordingly, this system requires long training period of time for higher stability and accuracy of the automatic control loop, which deteriorates transmission efficiency.

Further, there is a method of detecting the DC center level and amplitude of the bit synchronization signal from one or two cycle component thereof using the fact that the bit synchronization signal is transmitted generally in the form of a sinusoidal waveform, and of generating reference voltages for the decoding of the multi-valued using the detected DC center level and amplitude of the bit synchronization signal. This method can obtain the reference voltages which vary in accordance with the variation of the input signal, and can eliminate the disadvantage that the transmission efficiency is decreased because the period of time necessary to produce the reference voltages is extremely short. However, in this system, an integration circuit and detection circuit are used without a negative feedback control loop, and therefore, these circuits must be designed and constructed in view of high stability and accuracy. This also causes the increase of production cost.

SUMMARY OF THE INVENTION

Therefore, one important object of this invention is to provide a multi-valued signal decoding circuit producing the encoding reference voltages directly from the input signal by using very simple circuit arrangement, which does not have the disadvantage regarding the decrease of transmission efficiency, and which is simple in construction and is of high performance.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 illustrates a sample of a packet to which this invention may be applied:

FIG. 2 illustrates waveforms representative of the relationship between a four-valued signal and decoding reference voltages:

FIG. 9 illustrates waveforms for the operation of the decoding circuit: and

FIG. 10 is a circuit diagram for producing reference voltages used to decode a eight-valued data signal.

DESCRIPTION OF THE PREFERRED EMBODIMENTS

Figure 3:
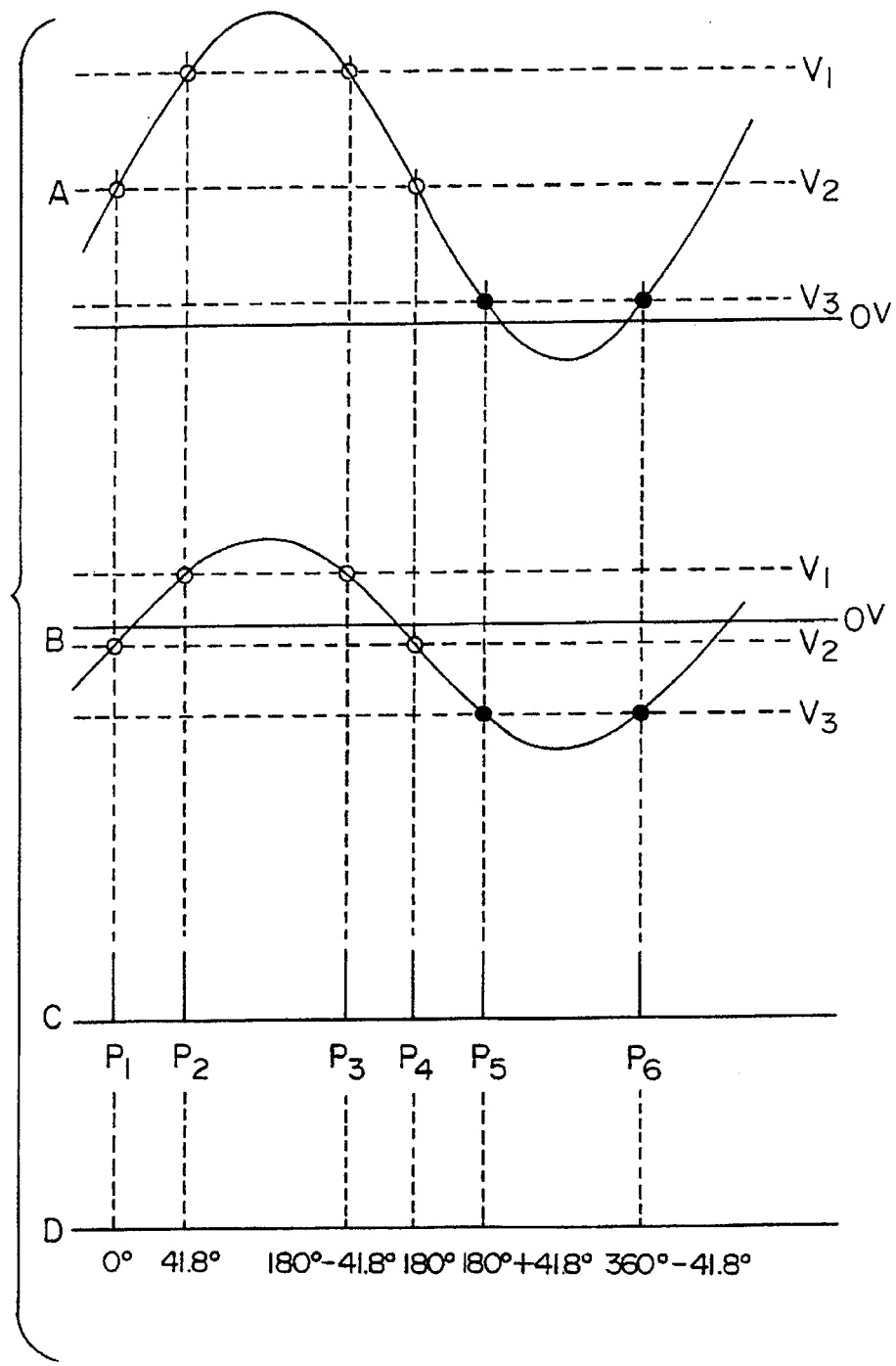
FIG. 3 illustrates waveforms used to explain processes for developing directly the decoding reference voltages from a bit synchronization signal.

FIG. 1 shows an example of a packet signal which is formatted to be constructed by six serial codes A to F. A identifies a bit synchronization code, B a frame synchronization code, C a calling code and a destination code, D a terminal control code, E a data transmission code and F an additional code for error detection. Usually, the codes A, B, C, D and F have the length in the order of several bites and the data transmission code has the length in the order of 100 to 1000 bites. The codes A–D form the header portion of the packet signal.

In the illustrated packet format, first the bit synchronization code A is transmitted as a signal of the order of several bits to dozens of bits. Generally, this signal is a repetitive signal assuming two values, and transmitted as a substantially sinusoidal waveform (which may be 2400 Hz in case where the synchronization code is 4800 bps). Also, if the data transmission code E is of multi-valued data, the codes A, B, C and D of the header portion of the packet are two-valued signals each having an amplitude equal to the maximum amplitude of the multi-valued data. In the specification, the bit synchronization code is referred as a bit synchronization signal in case where it means an analogue waveform, since the bit synchronization code is transmitted as a substantially sinusoidal waveform.

Thus, the bit synchronization signal is constant in its maximum amplitude, its amplitude is equal to the maximum amplitude of the multi-valued data signal and its waveform is substantially sinusoidal. Therefore, if this sine wave is sampled at an appropriate timing, a sampling output pulse can be derived of which voltage level is equal to a reference voltage necessary for decoding operation. If the voltage of the sampling output pulse is held during the period of the packet as the reference voltage, it follows that this reference voltage can be obtained directly from the input signal and correct decoding operation can be always maintained.

Though there are various multi-valued signals, a four-valued signal having its clock rate of 4800 bps is explained hereunder for the sake of simplicity for the explanation of the invention. In this case, the data transmission rate is 9600 bps.

FIG. 2 shows an example of the four-valued signal in which there is no error with respect to its center level and amplitude. In this Figure, waveform A identifies a portion of the bit synchronization signal as shown in FIG. 1, waveform E identifies a portion of the four-valued data signal and $P_0$ identifies sampling pulses which sample the level of the four-valued data signal waveform E at the timing of the occurrence of these pulses. As is shown in FIG. 2, when the voltage level of the waveform E at a sampling timing is above a reference level $V_1$, a signal "1 1" is provided, when the voltage level of the waveform E at a sampling timing is between the reference level $V_1$ and a reference level $V_2$, a signal "1 0" is outputted, when the voltage level of the waveform E at a sampling timing is between the reference level $V_2$ and a reference level $V_3$, a signal "0 1" is outputted, and when the voltage level of the waveform E at a sampling timing is below the reference level $V_3$, a signal "0 0" is provided. As is easily understandable from FIG. 2, it is desirable that the reference voltages $V_1$, $V_2$ and $V_3$ are set to the respective center voltage levels between two adjacent values of the four-valued input signal to obtain the maximum noise margin. Therefore, even though the DC center level and/or amplitude levels of the input signal are changed, the respective reference voltages $V_1$, $V_2$ and $V_3$ can shift depending upon such change so that the above-mentioned voltage relationship can be maintained.

FIG. 3 illustrates a waveform showing the timing relationship between the bit synchronization signal waveforms as shown in A and B and the sampling pulses as shown in C. In this Figure, A and B are two samples of the bit synchronization signal waveforms which are different from each other in the DC center level and maximum amplitude levels. C shows a series of sampling pulses $P_1$, $P_2$, $P_3$, $P_4$, $P_5$ and $P_6$ of which angular positions are shown by D. It is noted that the phase of the two waveforms A and B are the same. Even though the DC center level and peak amplitude levels are different between the waveforms A and B and the sampling reference voltages $V_1$, $V_2$ and $V_3$ for the waveform A differ in level from those for the waveform B, as is clear from the comparison of the waveforms A and B with the sampling pulses in C, the reference voltage $V_2$ can be obtained by sampling the waveforms by means of the sampling pulse $P_1$ or $P_4$ and holding the sampled level, the reference voltage $V_1$ can be obtained by sampling the waveforms by means of the sampling pulse $P_2$ or $P_3$ and holding the sampled level, and the reference voltage $V_3$ can be obtained by sampling the waveforms by means of the sampling pulse $P_5$ or $P_6$ and holding the sampled level. Therefore, if appropriate sampling pulses are produced, the correct reference voltages can be always provided.

The sampling pulses $P_1$ and $P_4$ may be derived from zero-cross (transition) point information of the received bit synchronization signal form which any DC offset component is removed. The sampling pulses $P_2$ or $P_3$ and $P_4$ or $P_6$ may be easily derived on the basis of the fact that the voltages $V_1$ to $V_2$ and $V_3$ to $V_1$ are ⅔ of the peak voltage (the maximum amplitude level) and $P_2$ and $P_4$ (or $P_3$ and $P_6$) occur at positions separating from $P_1$ and $P_4$ respectively by:

$$\sin^{-1}\frac{2}{3}.$$

Figure 4:
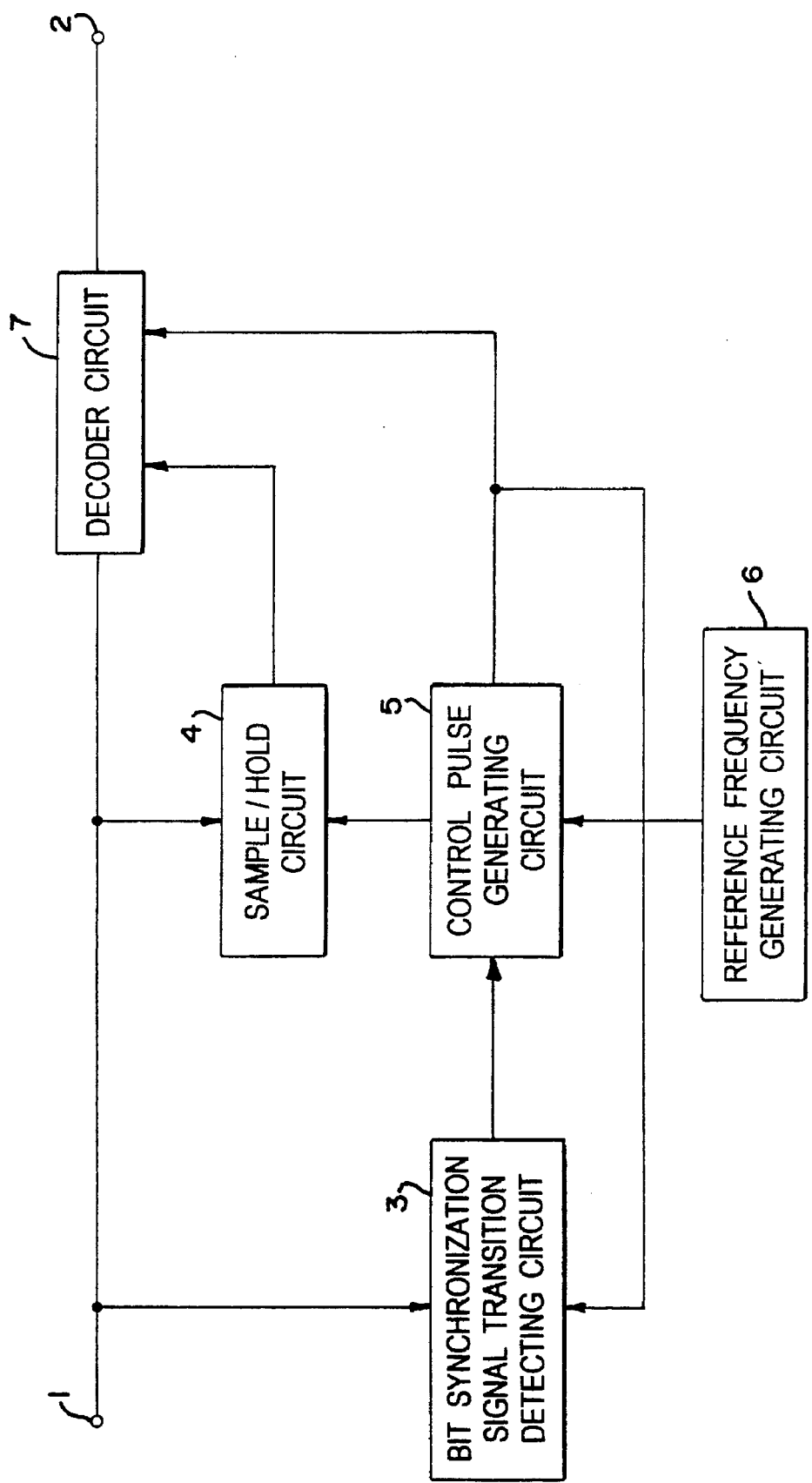
FIG. 4 is a block diagram showing a multi-valued signal decoding circuit according to one embodiment of this invention.

FIG. 4 shows one embodiment of this invention. In this Figure, reference numeral 1 identifies the output of a frequency discriminating circuit in case where the transmission system is a wireless FSK (frequency shift keying) system, for example, or the input terminal of a received signal in case where the transmission system is a wired system. This constitutes the input terminal of the multi-valued baseband signal. This signal is decoded into a digital signal in a decoder circuit 7 and provided to an encoded signal output terminal 2. The input terminal 1 is also connected to a bit synchronization signal transition (leading edge) detecting circuit 3 and to a sample/hold circuit 4 of which output is coupled to the decoder circuit 7. The output of the bit synchronization signal transition detecting circuit 3 is coupled to a control pulse generating circuit 5 which receives the output of a reference frequency generator 6. One output of the control pulse generating circuit 5 is coupled to the sample/hold circuit 4 and the other output of the control pulse generating circuit 5 is coupled to the decoder circuit 7 and the bit synchronization signal transition detecting circuit 3.

Figure 5:
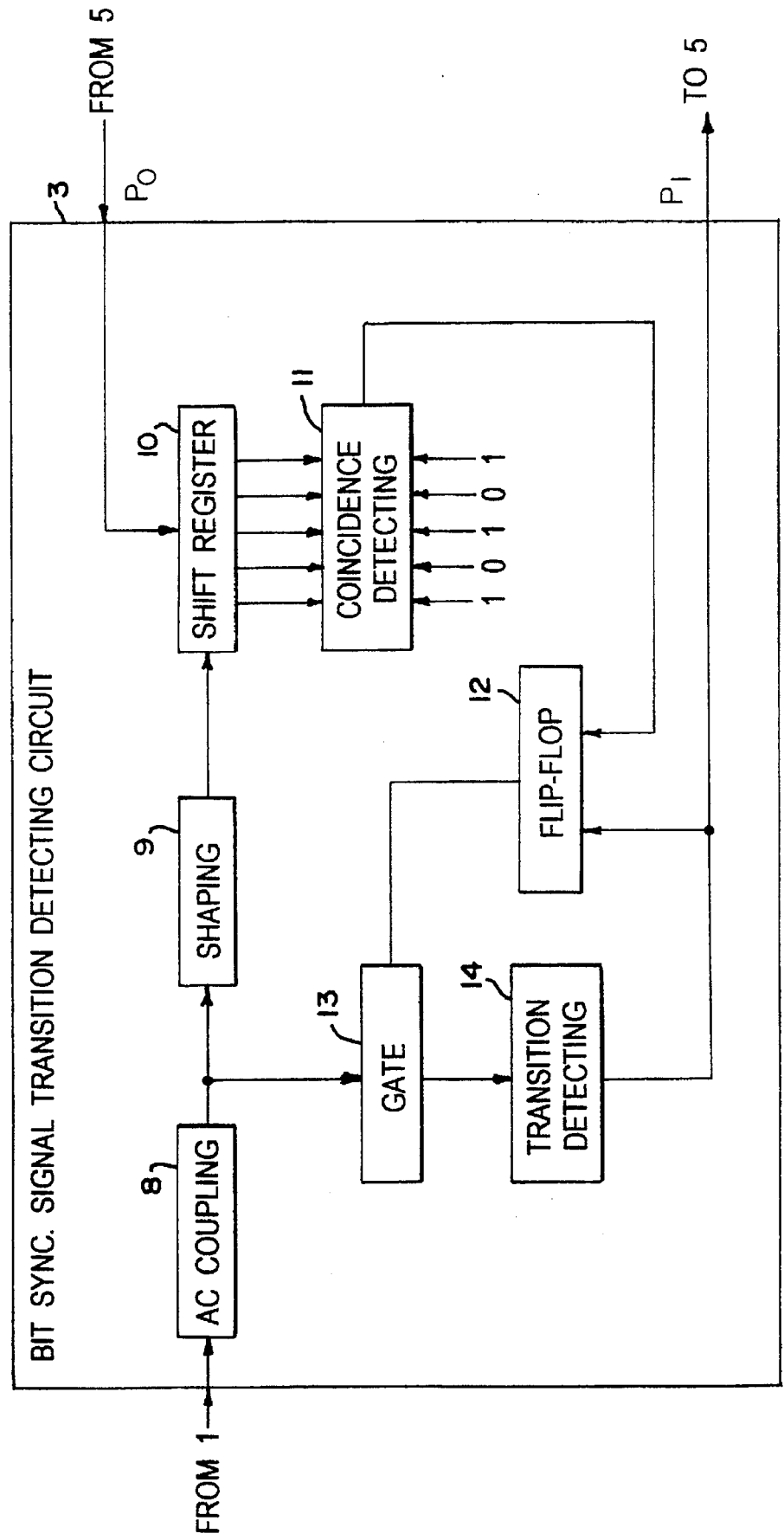
FIG. 5 is a block diagram showing a bit synchronization signal transition detecting circuit which is one element of the circuit shown in FIG. 4.

FIG. 5 shows one example of the bit synchronization signal transition detecting circuit 3 shown in FIG. 4. In this Figure, reference numeral 8 identifies an AC coupling circuit which constitutes the input circuit of the bit synchronization signal transition detecting circuit 3 and first receives the waveform A of the packet signal shown in FIG. 2. The AC coupling circuit 8 provides between its input and output the phase difference of zero with respect to the frequency of 2400 Hz of the bit synchronization signal. The AC coupling circuit 8 may be composed by using a combination of a high-pass filter and phase shifter, a band-pass filter or the like. This AC coupling circuit removes any DC offset of the input signal, and therefor the DC center level of the bit synchronization signal becomes zero as shown in the waveform A in FIG. 2. The output of the AC coupling circuit 8 is applied to a waveform shaping circuit 9 which convert the sinusoidal output signal from the AC coupling circuit 8 into a rectangular waveform signal. The rectangular waveform signal is accepted by a multi-stage shift register 10 in response to a clock pulse signal of 4800 pps from the control pulse generating circuit 5. That is, the respective rectangular waveforms are sequentially inputted into the sift register 10. The contents of the respective stages of the shift register 10 are examined in a coincidence detecting circuit 11 which compares the contents of the shift register stages with a predetermined comparison values (shown in the FIG. 5 as "1 0 1 0 1"). When the contents of the shift register stages are consistent with the predetermined comparison values comprising the bit ordering of the predetermined number of alternate "1" and "0", a coincidence detecting output is provided from coincidence detecting circuit 11 which is applied to a flip-flop circuit 12 to turn it to the set condition, so as thereby to open a gate circuit 13. By the opening of the gate circuit 13, a sinusoidal waveform of 2400 Hz having no DC offset is supplied to a transition detecting circuit 14 which detects the timing of the occurrence of a transition (the zero-cross point from the positive to negative) of the sinusoidal waveform and generates a pulse at this timing. This detection output pulse resets the flip-flop 12 and is sent to the control pulse generating circuit 5 as the transition indicating pulse.

Figure 6:
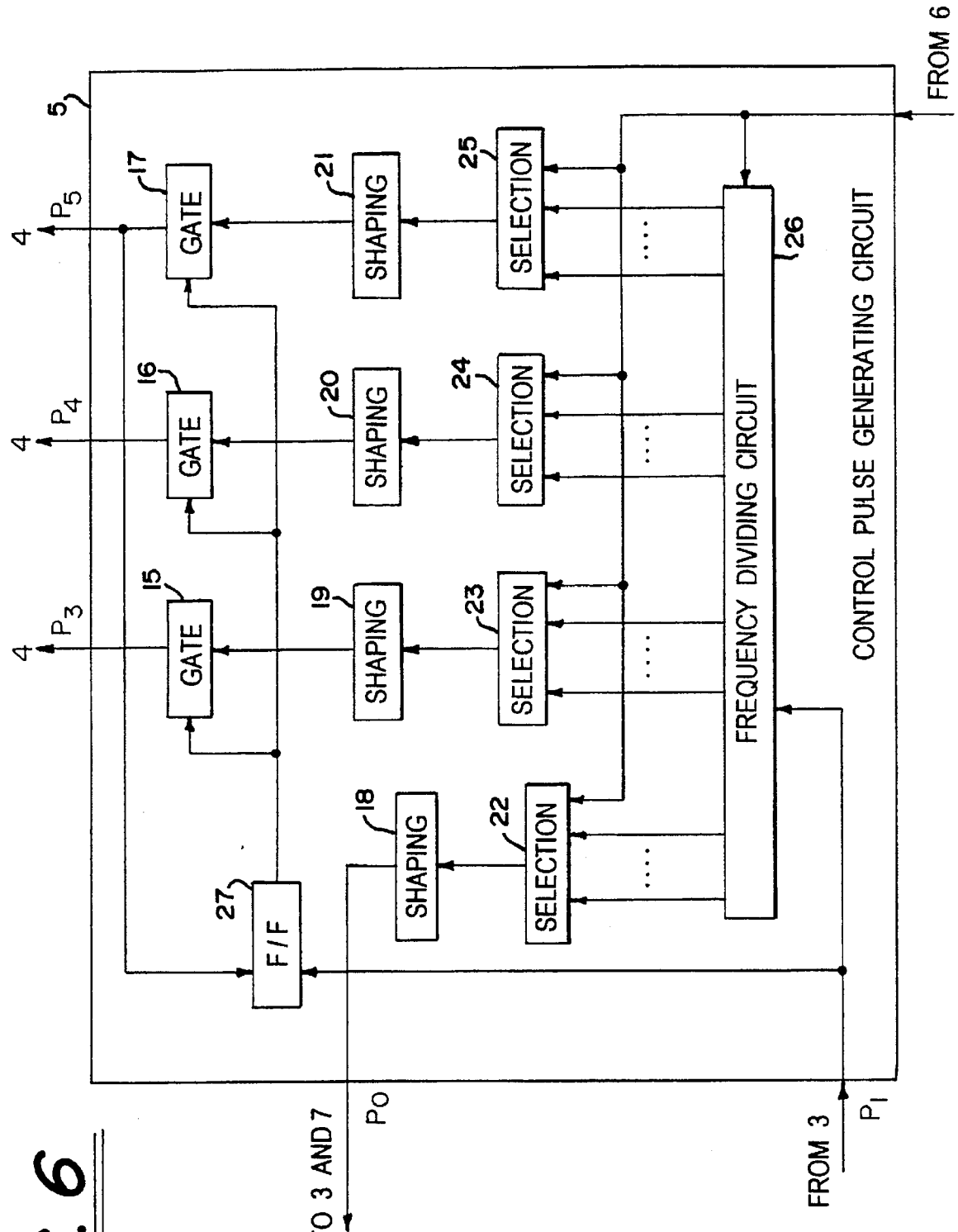
FIG. 6 is a block diagram showing a control pulse generating circuit which is another element of the circuit shown in FIG. 4.

FIG. 6 shows one example of the control pulse generating circuit 5 shown in FIG. 4. In this Figure, reference numerals 15, 16 and 17 identify gate circuits, respectively, 18, 19, 20 and 21 waveform shaping circuits, respectively, 22, 23, 24 and 25 selection circuits, respectively, 26 a frequency dividing circuit and 27 a flip-flop circuit.

When the flip-flop circuit 27 receives the transition indicating pulse from the bit synchronization signal transition detecting circuit 3 (particularly the transition detecting circuit 14), it is set to open the gate circuits 15, 16 and 17. Also, the transition indicating pulse reset the frequency dividing circuit 26. This frequency dividing circuit 26 receives a high resolution reference signal (of the degree of the frequency error of $1\times10^{-6}$) from the reference frequency generator 6. Since the frequency dividing circuit 26 can be regarded as a kind of a counter, the contents of the dividing circuit (binary counter) is momentarily made to zero every time it is reset (whenever it receives the reset signal), so that thereafter it can restart its counting operation.

Now it is assumed that the reference frequency is 307.2 Khz. The frequency dividing circuit 26 counts exactly 128 (0–127 counts) during one period of the bit synchronization signal of 2400 Hz. If the sampling pulses generated in the control pulse generating circuit are considered to be $P_3$, $P_4$ and $P_5$ in FIG. 3, the time shifts $t_3$, $t_4$ and $t_5$ of these pulses, respectively, from the occurrence time of $P_1$ can be expressed as follows:

$$t_3 = \frac{\pi - \sin^{-1}\frac{2}{3}}{\pi} \quad \frac{1}{4800} = 159.942 \, \mu s$$

$$t_4 = \frac{1}{4800} = 208.333 \, \mu s$$

$$t_5 = \frac{\pi + \sin^{-1}\frac{2}{3}}{\pi} \quad \frac{1}{4800} = 256.725 \, \mu s.$$

Since the frequency dividing circuit 26 carries out the counting operation on the basis of the rise timing $P_1$ of the bit synchronization signal, the counting of the dividing circuit 26 made at the most immediate timing to the above-mentioned $t_3$, $t_4$ and $t_5$ are the 49th, 64th and 79th, respectively, and their times $t_{c49}$, $t_{c64}$ and $t_{c79}$ are as follows:

$$t_{c49} = \frac{1}{2400} \quad \frac{49}{128} = 159.505 \, \mu s$$

$$t_{c64} = \frac{1}{2400} \quad \frac{64}{128} = 208.333 \, \mu s$$

$$t_{c79} = \frac{1}{2400} \quad \frac{79}{128} = 257.161 \, \mu s$$

Therefore, the resolution of the dividing circuit becomes less than 0.5 μs.

The selection circuit 23 selects the input reference frequency signal of 49th count, the selection circuit 24 selects the input reference frequency signal of 64th count and the selection circuit 25 selects the input reference frequency signal of 79th count. These selection circuits function to and required divider stage outputs and the reference frequency signal.

The output pulses from the selection circuit 23, 24 and 25 which have the time length of 1.628 μs (½·⅟307.2 ks), respectively, are applied to the shaping circuits 19, 20 and 21, respectively which shape the respective inputs from the selection circuits to the pulses of time length that the sampling circuit can accept. These shaped pulses from the shaping circuit 19, 20 and 21 are outputted through the respective gate circuits 15, 16 and 17 as the sampling pulses $P_3$, $P_4$ and $P_5$, respectively. These sampling pulses are supplied to the sample/hold circuit 4.

The flip-flop circuit 27 is connected to be reset by the sampling pulse $P_5$. Therefore, The gate circuits 15, 16 and 17 are closed by the output from the flip-flop circuit 27 until a next packet signal will be assembled.

The above-mentioned explanation was in the case where the reference frequency was selected to 307.2 kHz. It is appreciated that if the frequency is selected to higher frequency value and correspondingly increased frequency divider stages are used, the sampling pulse of more increased resolution can be obtained.

Figure 7:
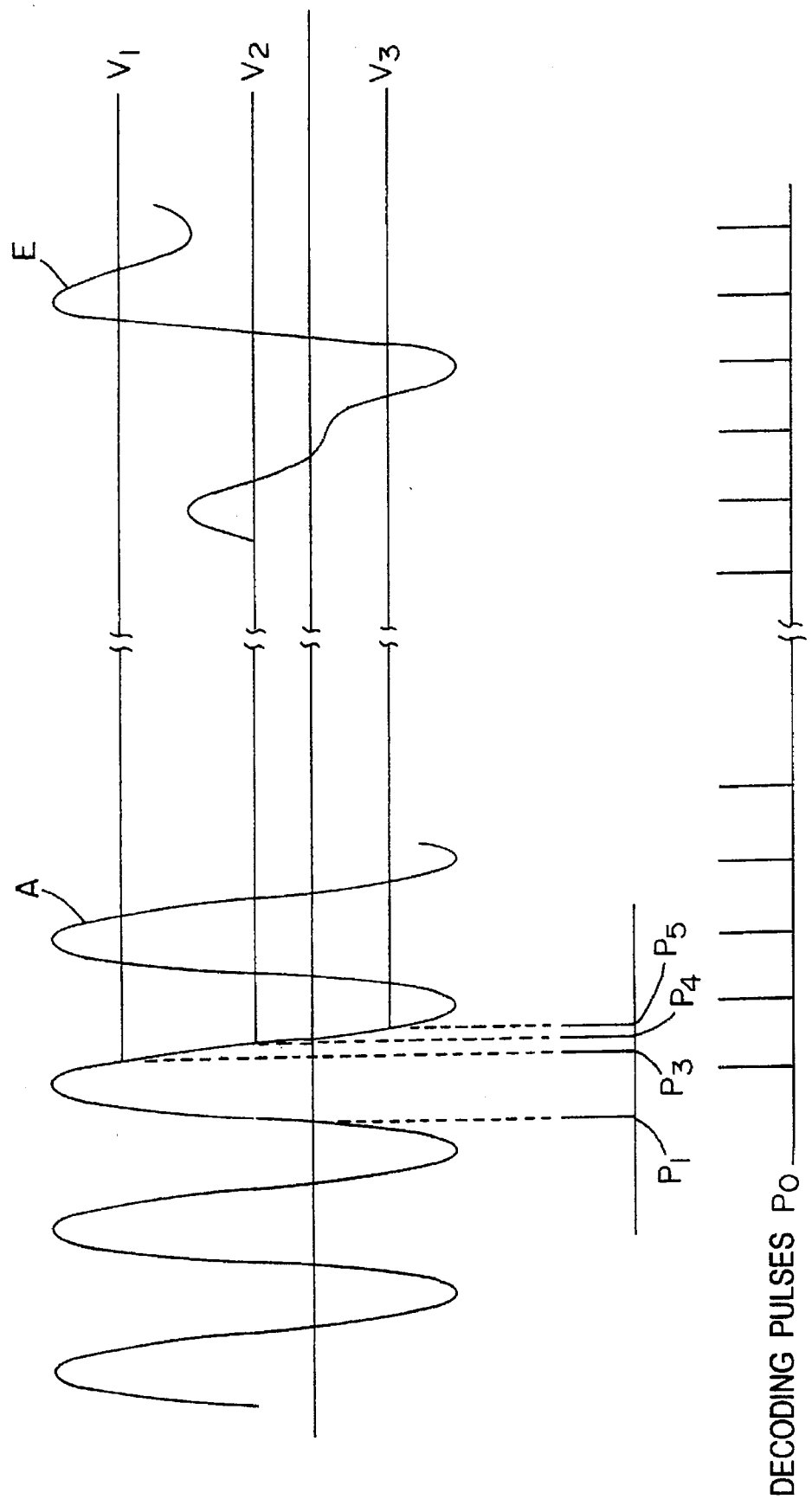
FIG. 7 illustrates waveforms for explaining the time relationship between the input signal and the control pulse generating circuit output.

In this manner, the control pulses $P_3$, $P_4$ and $P_5$ (sampling pulses) and decoding pulses $P_0$ having the time relationship as shown in FIG. 7 with the bit synchronization signal can be provided. The decoding pulses $P_0$ shown in FIG. 7 are produced by the selection circuit 22 and the shaping circuit 18 in response to the 32th count and 96th count of the dividing circuit 26. This general operation is the same as in the case of the selection circuits 23, 24 and 25 which act to generate the sampling pulses $P_3$, $P_4$ and $P_5$, respectively. The encoding pulses $P_0$ are generated at the timing of the positive and negative peaks of the bit synchronization signal waveform A and the correct four values of the four-valued data signal waveform E.

The sampling pulses $P_3$, $P_4$ and $P_5$ thus provided are applied to the sample/hold circuit 4 to sample the input bit synchronization signal and hold the sampled voltage levels. As is shown in FIG. 7, the sampling pulse $P_3$ samples the level on the bit synchronization signal envelope of the reference voltage $V_1$, the sampling pulse $P_4$ samples the level on the bit synchronization signal envelope of the reference voltage $V_2$, the sampling pulse $P_5$ samples the level on the bit synchronization signal envelope of the reference voltage $V_3$. The held voltage outputs of the levels $V_1$, $V_2$ and $V_3$ from the sample/hold circuit 4 are applied to the decoding circuit 7.

Figure 8:
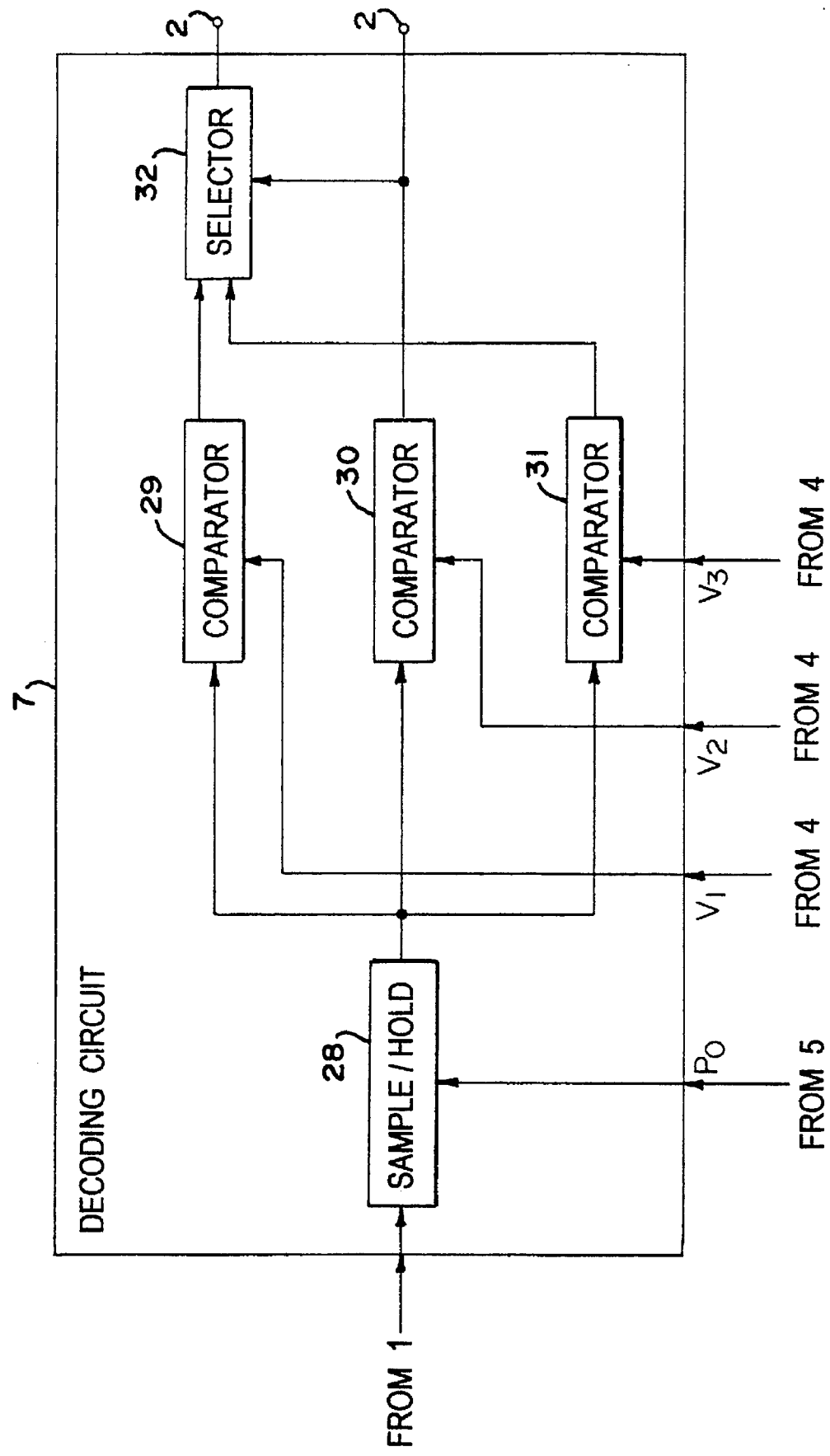
FIG. 8 is a block diagram showing a decoding circuit which is yet another element of the circuit shown in FIG. 4.

FIG. 8 shows one example of the decoding circuit 7 shown in FIG. 4. In this Figure, reference numeral 28 is a sample/hold circuit, 29, 30 and 31 comparators, and 32 a selector.

The sample/hold circuit 28 samples the input four-valued data signal (E in FIG.7) by a decoding pulse $P_0$ supplied from the control pulse generating circuit 5 and hold the sampled level until a next decoding pulse incomes. This operation is explained with respect to FIG. 9.

A dotted line 28 identifies the waveform of the output from this sample/hold circuit 28. The comparators 29, 30 and 31 receive commonly the output from the sample/hold circuit 28. Also, the comparators 29, 30 and 31 receive separately the reference voltage levels $V_1$, $V_2$ and $V_3$ from the sample/hold circuit 4 shown in FIG. 4, respectively. Therefore, the comparators 29, 30 and 31 provide outputs 29, 30 and 31 shown in FIG. 9, respectively. The outputs of the comparators 29 and 31 are applied two input terminals of the selector 32 and the output of the comparator 30 is applied the select control input terminal of the selector 32. When the output of the comparator 30 is "1", the output of the comparator 29 is selected in the selector 32 and outputted therefrom. When the output of the comparator 30 is "0", the output of the comparator 31 is selected in the selector 32 and outputted therefrom. Therefore, the output signal from the selector 32 is of one shown by 32 in FIG. 32.

The output from the comparator 30 and output from the selector 32 constitute the correctly decoded apparatus output signal which is applied to the encoded signal output terminal 2.

In the above-mentioned embodiment, the case where the pulses $P_3$, $P_4$ and $P_5$ were used as the sampling pulses for obtain the decoding reference voltages was explained. However, as is clear from the above description that as such sampling pulses $P_1$, $P_2$ and $P_5$ may be used. Also, the above-mentioned embodiment may be so changed that the fall zero-cross point of the bit synchronization signal, and the sampling pulses are generated on the basis of the timing when the fall zero-cross point was detected.

In the above-mentioned embodiment, this invention was explained by using as an example the decoding of the four-valued data signal. However, this invention is also applicable to the decoding of another multi-valued data signal.

In the case of a eight-valued data signal, for example, assuming that the maximum amplitude value (peak value) of the bit synchronization signal is 1.0, the decoding reference voltages $V_1$, $V_2$, $V_3$, $V_4$, $V_5$, $V_6$ and $V_7$ can be obtained from the following relation:

$$V_1 = \frac{6}{7}$$

$$V_2 = \frac{4}{7}$$

$$V_3 = \frac{2}{7}$$

$$V_4 = 0$$

$$V_5 = \frac{2}{7}$$

$$V_6 = \frac{4}{7}$$

$$V_7 = \frac{6}{7}$$

In this case, $V_1$ can be obtained by effecting the sampling at the timing of $$\sin^{-1} \frac{6}{7} = 59.0°$$

of the sinusoidal waveform of the bit synchronization signal and the holding of the sampled value, and $V_4$ can be obtained by effecting the sampling at the timing of the rise of the sinusoidal waveform of the bit synchronization signal and the holding of the sampled value. If these decoding reference levels $V_1$ and $V_4$ are obtained, all other reference voltages can be easily provided by using a circuit as shown in FIG. 10.

In FIG. 10, reference numeral 33 identifies an operational amplifier having an inverted input (−) and non-inverted input (+) as well as an output. All of the resisters R have the same resistance value. The inverted input and output of the operational amplifier 33 are connected by a feedback resister R. The reference voltage $V_1$ as obtained by the above method is applied to the inverted input of the amplifier 33 through a input resister R. The reference voltage $V_4$ as also obtained by the above method is applied directly to the non-inverted input of the amplifier 33. Therefore, the output of the amplifier 33 provides $2V_4-1$ which corresponds to $V_7$. Therefore, a voltage divider comprising six resisters R of the same resistance for dividing the voltages $V_1$, $V_4$ and $V_7$ can provides all necessary reference voltage levels $V_2$, $V_3$, $V_5$ and $V_6$.

With reference to the above-mentioned embodiment, it was explained that a more correct reference voltages can be provided by increasing the reference frequency as much as possible to make the time error of the sampling pulses smaller. However, in accordance with this invention, the following method can produce a correct reference voltages.

That is to say, in the embodiment relating to the four-valued decoding, when the reference frequency is 307.2 kHz, $t_3-t_{c49}$ was 0.437 µs. At that time, the sampled output voltage with a time error is:

$$\sin \frac{t_{c64} - t_{c49}}{t_{c64}} \pi = 0.67156$$

which is 1.00734 times with respect to the correct voltage (⅔=0.66666). Therefore, if the difference of the sampled output voltages based on $t_{c49}$ and $t_{c64}$ is made 1/1.00743 times, a reference voltage without an error can be obtained. This method makes the frequency divider circuit simpler so that it can use a lower frequency. By progressing this method, the following embodiment can be attained.

That is to say, in FIG. 3, in place of $P_2$ and $P_3$, the center therebetween, that is the positive peak value is sampled, and in place of $P_5$ and $P_6$, the center therebetween, that is the negative peak value is sampled. Since these sampled voltage levels with respect to $V_2$ are the peak amplitude level itself, the correct reference voltages $V_1$ and $V_3$ can be obtained from the following equations:

$$V_1 = \frac{2}{3}(V_{p+} - V_2) + V_2$$

$$V_3 = \frac{2}{3}(V_{p-} - V_2) + V_2$$

in which $V_{p+}$ and $V_{p-}$ are the positive and negative peak values, respectively. These calculations can be easily carried out by an operational amplifier arrangement. In this method, it is possible to use a positive peak holding circuit and negative peak holding circuit in place the sample/hold circuit as used in the above-mentioned embodiment, to pick up the positive peak value and negative peak value, respectively.

As explained in detail, according to this invention, it can be constructed with the very simple circuits because in the decoding of the multi-valued data transmission signal assembled into a packet format, the decoding reference voltages is produced by simply sampling the bit synchronization signal included in the header portion of the packet and holding the sampled levels. Further, according to this invention, it can always obtain the decoding reference voltages which are correct relatively with respect to the received signal and can always maintain the noise margin maximum even when there is any change in the DC center level and amplitude of the received signal because the decoding reference voltages are produce directly from the received signal.

It should be understand that although preferred embodiments of this invention have been illustrated and described, various modifications thereof will become apparent to those skilled in the art.

What is claimed is:

1. A multi-valued signal decoding circuit for decoding a multi-valued data signal transmitted in the form of a packet signal comprising:

a bit synchronization signal transition detecting circuit for detecting the timing of a transition of the bit synchronization signal included in said multi-valued data signal by using a detection output signal obtained from the detection of a repetition of "1, 0" of said bit synchronization signal;

a control pulse generating circuit for generating a sampling pulse signal on the basis of said detected timing;

a sample/hold circuit for sampling said bit synchronization signal by using said sampling pulse signal and holding the sampled levels; and a decoder circuit for decoding said multi-valued data signal by using the sampled and held levels as decoding reference voltages.

2. The multi-valued signal decoding circuit of claim 1 wherein said detecting circuit detects, as the timing of the transition of said bit synchronization signal, a timing when said bit synchronization signal is coincide with a predetermined sequence of recursion of "1, 0".

3. The multi-valued signal decoding circuit of claim 2 wherein said detecting circuit further comprising means for removing any DC offset of said bit synchronization signal in advance of the detection of the coincidence.

4. The multi-valued signal decoding circuit of claim 1 wherein said control pulse generating circuit includes:

counter means starting its count operation upon the receipt of a timing signal representative of said detected timing; and means for forming said sampling pulse signal in response to the occurrence of a predetermined count value representative of the timing of a waveform position of said bit synchronization signal separating by a predetermined distance from said detected transition position.

5. The multi-valued signal decoding circuit of claim 4 further comprising means for detecting a predetermined count value of said counter means and in response thereto forming a decoding pulse signal.

* * * * *